No. 814,905. PATENTED MAR. 13, 1906.
C. O. ERICSON.
SPEED INDICATOR.
APPLICATION FILED MAR. 24, 1905.
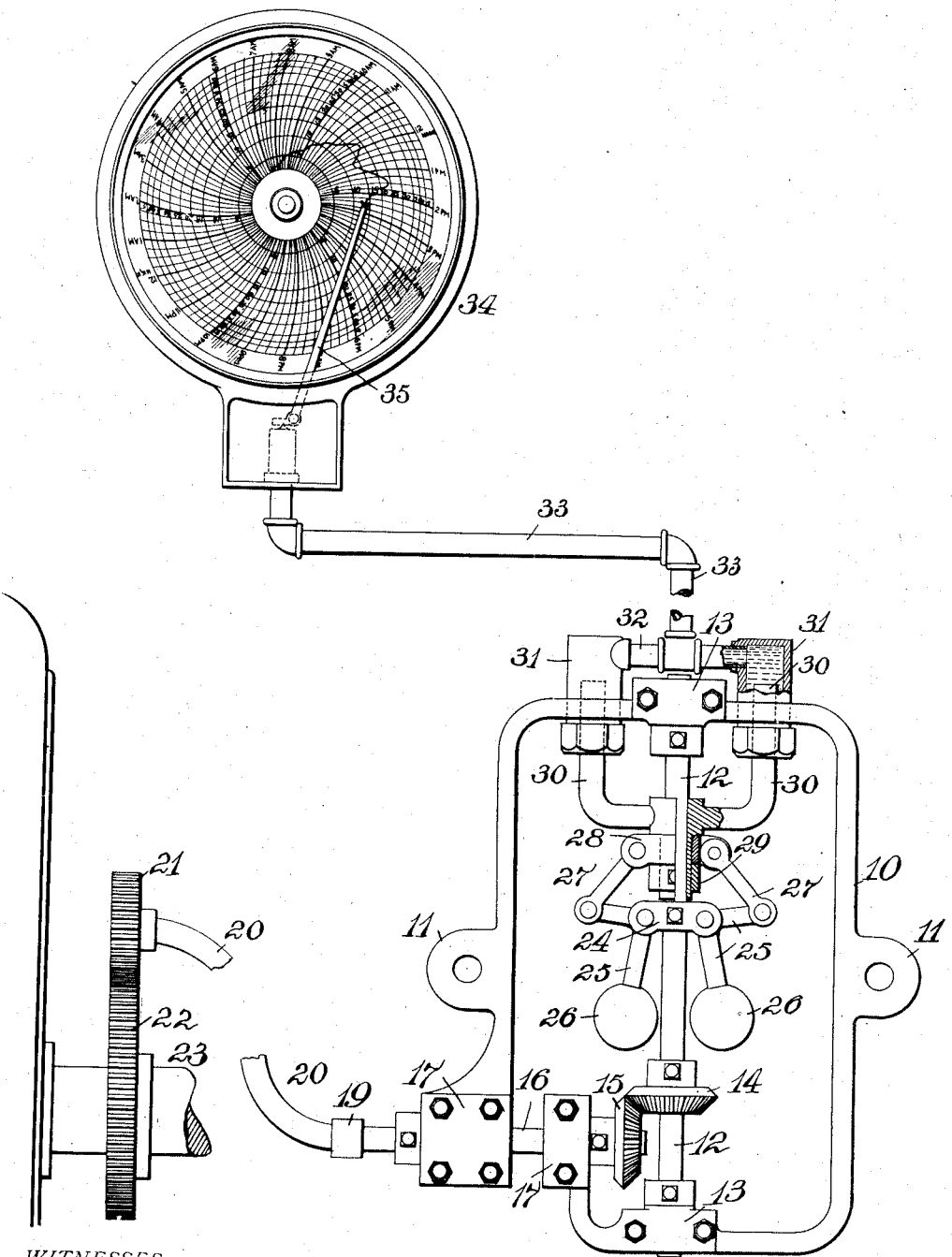
WITNESSES:
Wm H Canfield
Frank L Stubbs
INVENTOR.
Charles O. Ericson,
BY
W. B. Hutchinson,
ATTORNEY.

UNITED STATES PATENT OFFICE.

CHARLES OSCAR ERICSON, OF HELMETTA, NEW JERSEY.

SPEED-INDICATOR.

No. 814,905.　　　Specification of Letters Patent.　　Patented March 13, 1906.

Application filed March 24, 1905. Serial No. 251,773.

*To all whom it may concern:*

Be it known that I, CHARLES OSCAR ERICSON, of Helmetta, in the county of Middlesex and State of New Jersey, have invented a new and Improved Speed-Indicator, of which the following is a full, clear, and exact description.

My invention relates to improvements in speed-indicators for wheeled vehicles, and more particularly to recording speed-indicators.

The object of my invention is to produce a very simple apparatus which can be easily attached to an automobile, wagon, car, or other wheeled vehicle and which will act easily and accurately to indicate the speed at which the vehicle is traveling, and, further, to construct and arrange the apparatus so that a record can be kept of the speed of the vehicle during a period of time.

My invention is further intended to make the apparatus simple and positive and to construct it so that it can be easily attached to an ordinary vehicle and connected with the rotating parts thereof.

With these ends in view my invention consists of certain features of construction and combinations of parts, which will be hereinafter described and claimed.

Reference is to be had to the accompanying drawing, forming a part of this specification, in which the figure is a broken diagrammatic elevation, partly in section, of the complete apparatus.

The apparatus is provided with a suitable frame 10, which can be of any approved design and the shape of which will vary according to the parts to which it is to be attached, and this frame has preferably perforated ears 11 to permit it to be fastened to the frame of the vehicle. However, the manner of supporting the working parts of my apparatus is not very material. Mounted in the frame is a rotating shaft 12, which is held in suitable bearings 13, and this shaft connects, by gears 14 and 15, with a second shaft 16, which is at right angles to the shaft 12 and which is held in suitable bearings 17. The shaft 16 can be driven in any suitable way, or instead of driving the shaft 12 from the shaft 16 the shaft 12 can in some cases be driven directly—as, for instance, by attaching a flexible shaft direct to one end of the shaft 12. As shown, however, the shaft 16 is connected by a suitable coupling 19 to a flexible shaft 20, and the latter connects by pinions 21 and 22 with the axle 23 of the vehicle. As I have above remarked, however, the particular means of driving the shaft 12 from some rotating part of the vehicle is not very essential.

Secured to the shaft 12 is a yoke 24, to opposite sides of which are pivoted the bell-cranks 25, and these carry at their free ends the balls or weights 26. The other ends of the bell-cranks connect pivotally by links 27 with a collar 28, which is secured to the sleeve 29, and this slides on the shaft 12. Rigid on the sleeve are the arms 30, which are bent into parallel relation with the shaft 12 and serve as pistons to displace the liquid in the cylinders 31, into which the piston-arms 30 enter. The cylinders 31 connect by a pipe 32 with the pipe 33, which leads to the gage 34, and this latter can be any of the several standard forms of registering or recording gages and, in fact, can be any usual indicating-gage. As illustrated, it has a hand 35, which is operated, as usual, by the displacement of liquid in the pipes 33 and 32 and cylinders 31. Obviously a single cylinder 31 and piston 30 could be used; but I prefer to use the cylinders and their pistons in pairs, as in this way I get a better balancing effect and the operation is steadier, easier, and more accurate. It will be seen that as the speed of the vehicle increases the balls or weights 26 will be rotated and will fly out from the shaft 12 like the ordinary governor-balls of an engine and that the sleeve 29 and pistons 30 will be moved up and down with the rise and fall of the balls and with the consequent movement of their connecting-levers.

The recording-gage 34 has the dial-sheets, which are rotated by clockwork in the ordinary manner; but instead of being divided so as to indicate pounds, as in a steam-gage, or degrees, as in a recording-thermometer, the dial-sheets are divided so as to represent hours of the day, as the drawing shows, and the sheet is also divided by radial lines to represent fractions of the hours and by circular lines to represent speed-spaces, which spaces are appropriately indicated by numbers, as the drawing shows. It will be seen, therefore, that as the vehicle moves and time elapses the hand 35 will be moved in and out with the speed variations of the vehicle and that the varying pressure will leave a line on the dial which at the end of the trip will indicate the speed during the several intervals of elapsed time. By watching the hand the driver will also know the speed at which he is traveling at any time. For instance, the hand, as shown on the drawing, is nearly on the fifteen-mile line and would indicate that the vehicle was traveling at the rate of about fourteen miles per hour.

It will be understood that the gage itself is no part of my invention and that I do not limit it to the use of any particular style of recording or indicating gage.

In practice the gage 34 can be fastened to the dashboard or some convenient part of the vehicle, the frame 10 and the parts which it carries can be fastened underneath the body of the vehicle, and the connection with the wheel or axle can be made in any usual way, or as indicated.

Having thus fully described my invention, I claim as new and desire to secure by Letters Patent—

An apparatus of the kind described comprising a supporting-frame adapted to be attached to a vehicle, a shaft journaled in the frame, a sleeve slidable on the shaft, speed-balls hung on the shaft and connected with the sleeve to operate it, a recording-gage, a pair of opposed liquid-containing cylinders supported on the aforesaid frame and connected with the recording-gage, and arms extending from opposite sides of the sleeve and terminating in pistons which project into the aforesaid cylinders.

CHARLES OSCAR ERICSON.

Witnesses:
  WM. K. IRONS,
  C. E. WIDEBERZ.